(12) United States Patent
Bouti

(10) Patent No.: US 7,156,634 B2
(45) Date of Patent: Jan. 2, 2007

(54) INJECTION MOLDING MACHINE SPIGOTTED SHOOTING POT PISTON

(75) Inventor: Abdeslam Bouti, Swanton, VT (US)

(73) Assignee: Husky Injection Molding Systems Ltd. (CA)

( * ) Notice: Subject to any disclaimer, the term of this patent is extended or adjusted under 35 U.S.C. 154(b) by 251 days.

(21) Appl. No.: 10/879,581

(22) Filed: Jun. 30, 2004

(65) Prior Publication Data

US 2006/0003039 A1    Jan. 5, 2006

(51) Int. Cl.
B29C 45/02 (2006.01)
B29C 45/16 (2006.01)
B29C 45/53 (2006.01)

(52) U.S. Cl. .................. 425/130; 425/559; 425/561

(58) Field of Classification Search ............... 425/130, 425/557, 558, 559, 560, 561
See application file for complete search history.

(56) References Cited

U.S. PATENT DOCUMENTS

| | | | |
|---|---|---|---|
| 4,592,721 A * | 6/1986 | Charlebois et al. | 425/558 |
| 4,710,118 A | 12/1987 | Krishnakumar et al. | 425/130 |
| 4,717,324 A | 1/1988 | Schad et al. | 425/130 |
| 4,775,308 A * | 10/1988 | Schad et al. | 425/130 |
| 5,112,212 A * | 5/1992 | Akselrud et al. | 425/557 |
| 5,200,207 A * | 4/1993 | Akselrud et al. | 425/557 |
| 5,447,425 A * | 9/1995 | Hsu et al. | 425/557 |
| 5,858,420 A * | 1/1999 | Szajak et al. | 425/557 |
| 6,821,101 B1 * | 11/2004 | Kohler et al. | 425/130 |
| 7,014,454 B1 * | 3/2006 | Eichlseder | 425/557 |

FOREIGN PATENT DOCUMENTS

EP    0 624 449 A2    11/1994

* cited by examiner

Primary Examiner—Robert Davis
Assistant Examiner—Joseph Leyson
(74) Attorney, Agent, or Firm—Katten Muchin Rosenman LLP

(57) ABSTRACT

An injection molding shooting pot configured to be installed in a coinjection hot runner with a coinjection nozzle, the coinjection nozzle having at least two melt channels ending at the same gate. The injection molding shooting pot includes a shooting pot piston having a proximal end and a distal end. A shooting pot piston extension is disposed at the distal end of the shooting pot piston, and is configured to dislodge a check valve moving element during a discharge cycle of the shooting pot piston.

19 Claims, 4 Drawing Sheets

INJECTION MOLDING MACHINE SPIGOTTED SHOOTING POT PISTON

BACKGROUND OF THE INVENTION

1. Field of the Invention

The present invention relates to a spigotted shooting pot piston incorporated within the body of a shooting pot cylinder of a coinjection hot runner assembly in an injection molding machine.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same gate. Some coinjection hot runner systems include shooting pots to meter material of one plastic resin so that each cavity of a multi-cavity mold receives an accurate dose of that resin in the molding cycle. Some design configurations use check valves to prevent backflow of the resin when the shooting pot discharges the resin through the nozzle. See also:

U.S. patent application Ser. No. 10/879,576 entitled INJECTION MOLDING MACHINE SHOOTING POT WITH INTEGRAL CHECK VALVE;

U.S. patent application Ser. No. 10/879,621 entitled APPARATUS AND METHOD FOR SEALING INJECTION UNIT AND SPRUE;

U.S. patent application Ser. No. 10/879,575 entitled APPARATUS AND METHOD FOR ACTUATION OF INJECTION MOLDING SHOOTING POTS;

U.S. patent application Ser. No. 10/879,582 entitled CONTROL SYSTEM FOR A DYNAMIC FEED COINJECTION PROCESS;

U.S. patent application Ser. No. 10/880,494 entitled HOT RUNNER COINJECTION NOZZLE WITH THERMALLY SEPARATED MELT CHANNELS;

U.S. patent application Ser. No. 10/880,493 entitled COINJECTION MOLDING COOLED SHOOTING POT CYLINDER;

U.S. patent application Ser. No. 10/887,353 entitled APPARATUS AND METHOD FOR INJECTION MOLDING; SHOOTING POT WEDGE FEATURE.

U.S. Pat. No. 4,717,324 to Schad teaches a coinjection hot runner system including shooting pots that use rotary valves to prevent backflow. Check valves, as disclosed in U.S. Pat. No. 4,710,118 to Krishnakumar may be preferable to rotary valves to reduce leakage problems, reduce cost, and save space in the mold.

Often, such check valves become blocked or jammed with plastic resin, disrupting normal operations of the mold. In particular, the moving element of the check valve (typically a ball or the like) may pick up degraded, partially solidified resin debris, foreign matter, or carbonized resin, that can act like an adhesive, causing the moving element to stick to the check valve chamber wall in the open or partially open position. This allows resin to flow back into the melt inlet channel, and causes a short shot to be injected into the mold resulting in a defective part. There may be other causes for the moving element to stick in the open position, such as a deformed moving element, particles in the resin, improper injection pressure, etc. Moreover, the resin flow around the ball often does not generate enough pressure to displace it. This disfunction may block the check valve ball movement during injection. Thus, blockage problems with check valves remain to be solved.

SUMMARY OF THE INVENTION

It is an advantage of the present invention to provide shooting pot method and apparatus whereby the check valve is mechanically actuated to ensure proper operation.

According to a first aspect of the present invention, a unique combination of structure and/or steps are provided for an injection molding shooting pot configured to be installed in a coinjection hot runner with a coinjection nozzle, the coinjection nozzle having at least two melt channels ending at the same gate. Preferably, the injection molding shooting pot includes a shooting pot piston having a proximal end and a distal end. A shooting pot piston extension is disposed at the distal end of the shooting pot piston, and is configured to dislodge a check valve moving element during a discharge cycle of the shooting pot piston.

According to a second aspect of the present invention, a unique combination of structure and/or steps are provided for an injection molding hot runner assembly configured to be coupled to a coinjection nozzle having at least two melt channels ending at the same gate. Preferably, the hot runner assembly includes an inlet melt channel, and an outlet melt channel. A shooting pot assembly is disposed between the inlet melt channel and the outlet melt channel. The shooting pot assembly preferably includes a shooting pot cylinder and a shooting pot piston. A check valve is disposed within or immediately adjacent to the shooting pot cylinder, the check valve including a movable occlusion. An extension is disposed on a distal end of the shooting pot piston, and is configured to contact and move the check valve occlusion during an injection operation of the shooting pot piston.

According to a third aspect of the present invention, a unique combination of structure and/or steps are provided for an injection molding machine having a mold cavity, and a nozzle configured to inject a melt into the mold cavity. An outlet melt channel is configured to carry melt to the nozzle. A shooting pot cylinder is configured to discharge melt to the outlet melt channel upon activation of the shooting pot piston, and a shooting pot piston is provided inside the shooting pot cylinder. An inlet melt channel is configured to carry melt to the shooting pot cylinder. A check valve is disposed between the inlet melt channel and the outlet melt channel, the check valve including a check valve occlusion. An extension is disposed on a distal end of the shooting pot cylinder and is configured to contact and move the check valve occlusion during an injection operation of the shooting pot piston.

According to a fourth aspect of the present invention, a unique combination of steps are provided for an injection mold including a mold cavity, and a coinjection nozzle configured to inject a melt into the mold cavity, the coinjection nozzle having at least two melt channels ending at the same gate. An outlet melt channel is configured to carry melt to the nozzle. A shooting pot cylinder is configured to discharge melt to an outlet melt channel upon activation of a shooting pot piston. An inlet melt channel is configured to carry melt to the shooting pot cylinder, and a check valve is disposed between the inlet melt channel and the outlet melt channel, the check valve including a check valve occlusion. An extension is disposed on a distal end of the shooting pot piston, and is configured to contact and move the check valve occlusion during an injection operation of the shooting pot piston.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a spigotted shooting pot piston is used with a check valve in a plastic resin, multi-layer, co-injection molding machine.

Figure 1:
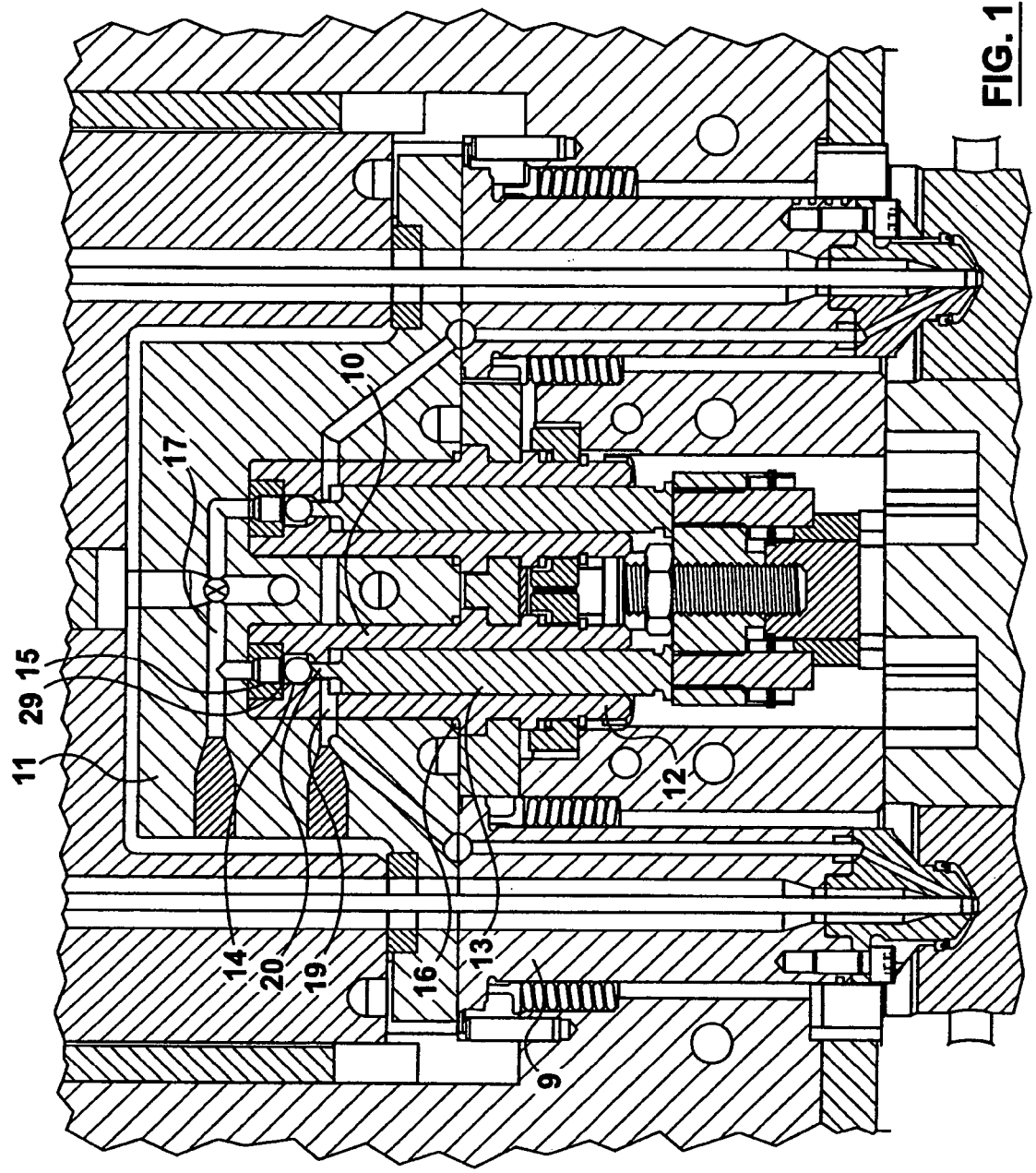
FIG. 1 is a schematic view of a portion of the coinjection hot runner assembly according to a first embodiment of the present invention.

FIG. 1 shows a portion of a coinjection hot runner assembly. A shooting pot assembly 10 is shown mounted in a "C" resin hot runner manifold 11. It comprises a shooting pot cylinder 12, a shooting pot piston 13, a ball check valve 14, plug 15, and a seal 16. Preferably, the check valve assembly (comprising the ball 14 and the check valve chamber 29) is disposed wholly or partially within (integral with), or immediately adjacent to the shooting pot cylinder 12. Resin is supplied to the shooting pot cylinder 12 via an inlet melt channel 17 and leaves the shooting pot en route to the nozzle assembly 9 via an outlet melt channel 19.

The check valve 14 is used to control the flow of the resin from the inlet melt channel 17 to the shooting pot cylinder 12 when metering, and from the shooting pot cylinder 12 to the nozzle 9 during injection. As noted above, in some cases the check valve occlusion (e.g., a ball) 14 jams or sticks in the open position and does not come back to the closed position so that when the shooting pot piston 13 advances to discharge the contents of the shooting pot cylinder 12, the check valve 14 does not close promptly, thereby allowing resin to flow backwards into the inlet melt channel 17 of the hot runner manifold 11. Consequently, a reduced amount of resin is injected into the mold cavity causing improper dosing and defective molded parts.

2. The First Embodiment

Figure 2:
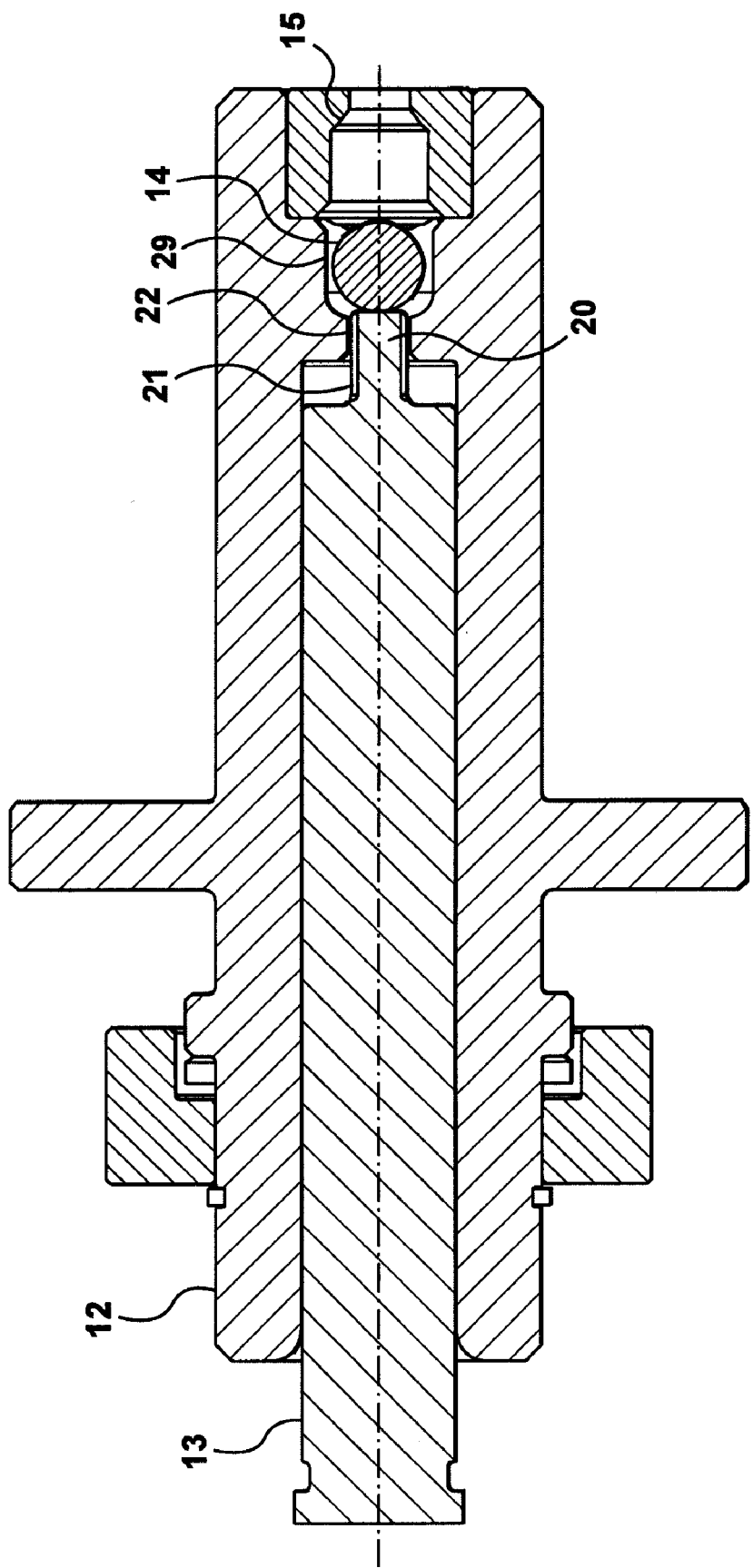
FIGS. 2 and 3 respectively comprise a detailed view and a perspective view of a portion of the shooting pot assembly shown in FIG. 1, showing a check valve according to the first embodiment of the present invention.
Figure 3:
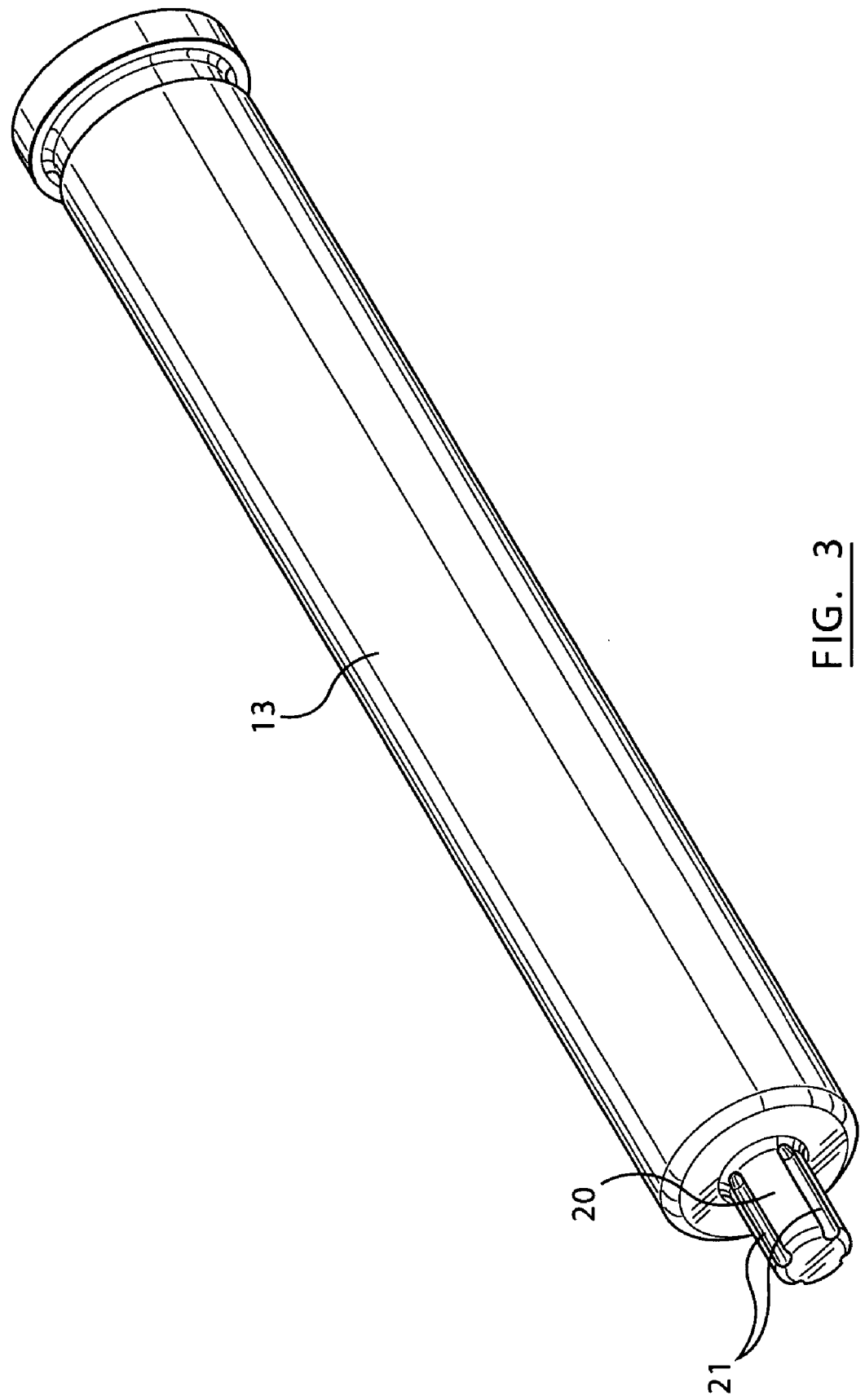

FIGS. 2 and 3 show a first embodiment according to the present invention. In particular, a short, cylindrically shaped spigot extension (or dislodging structure) 20 is coaxially disposed at the distal end of the cylindrical shooting pot piston 13, opposite the proximal end. The spigot extension 20 is preferably of a one-piece construction (integral) with the shooting pot piston 13, but may comprise a different material which is bolted, glued, soldered, or otherwise affixed to the distal end of the shooting pot piston 13. Preferably, the spigot extension 20 has a cylindrical shape that is longitudinally shorter than, and has a smaller external diameter than, the shooting pot piston 13. The spigot extension 20 external diameter allows it to pass freely inside the transition channel 22 from the cylinder to the check valve chamber (ball housing) 29. Axial grooves 21 are provided to allow any backflow of the resin when the spigot enters the transition channel 22. Preferably, the spigot extension 20 has a smaller external diameter than the check valve ball 14. As one example, the shooting pot piston 13 and the spigot extension 20 are an integral piece made of H-13 steel. The shooting pot piston is 70 mm long with an external diameter of 10 mm. The spigot extension 20 is 6 mm long with an external diameter of 4 mm. Of course, the shape, size, and dimensions of the shooting pot piston 13 and the spigot extension 20 may be varied depending upon the material being molded and the method of molding adopted.

In operation, the moving element (ball 14) of the check valve can be dislodged mechanically toward the end of each injection cycle, thereby reducing and/or preventing jamming or sticking of the moving element. At each cycle, as the shooting pot piston advances down the shooting pot cylinder 12, the spigot extension 20 moves the ball 14, if it has not yet moved by the force of the flowing melt. Since the spigot extension 20 has an external diameter smaller than that of the shooting pot piston 13, as the shooting pot piston advances, resin melt may flow around the spigot extension 20 and into the outlet melt channel 19. The longitudinally-extending slots or channels 21 allow the melt to pass freely along its sides when flowing into or out of the shooting pot when the extension 20 enters the opening 22 of the check valve chamber 29. The length of the spigot extension 20 is designed such that the ball 14 can be physically moved before the absolute end of the discharge cycle, so that minimal melt will flow back into the inlet melt channel 17 during the next cycle.

3. The Second Embodiment

Figure 4:
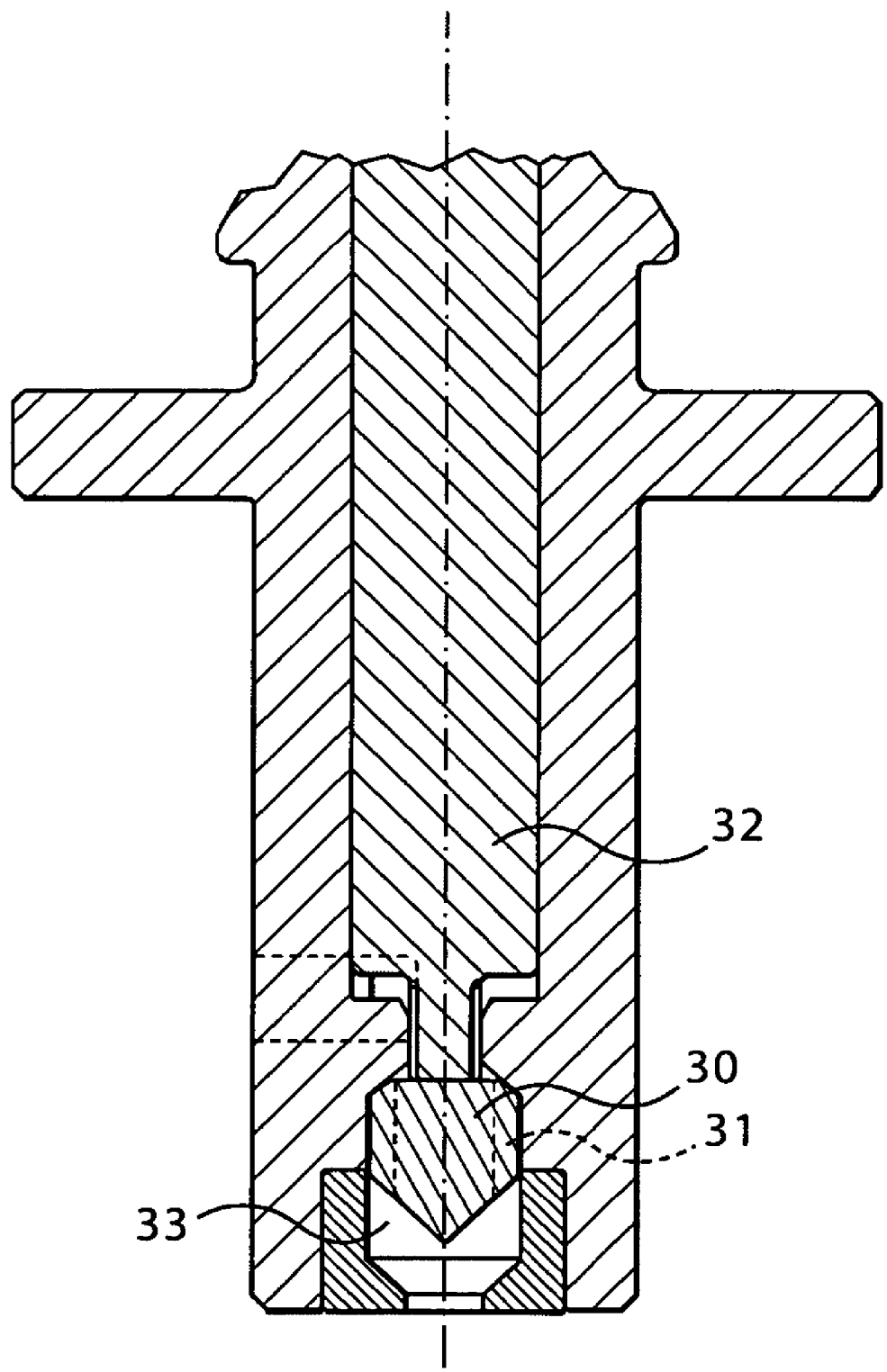
FIG. 4 is a detailed view of a portion of the shooting pot assembly according to a second embodiment of the present invention.

FIG. 4 shows an alternate embodiment in which the check valve moving element comprises a shaped insert 30, which has a conically-shaped distal end to allow the incoming melt to flow into the check valve chamber 33 more easily that the surface of a check valve ball. Preferably, the shaped insert 30 has side slots 31 which are deep enough to allow incoming resin to pass through the shaped insert 30, but shallow enough to prevent backflow during the injection stroke of the piston 32. For example the dimensions of the shaped insert 30 and its slots 31 are 9 mm long, 8 mm in diameter with slots 1 mm deep.

4. Conclusion

Thus, what has been described is a method and apparatus for reducing and/or eliminating the jamming or blockage of a check valve in the shooting pot of an injection molding machine.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patents and patent applications discussed above are hereby incorporated by reference into the Detailed Description of the Preferred Embodiments.

What is claimed is:

1. An injection molding shooting pot apparatus configured to be installed in a coinjection hot runner with a coinjection nozzle, the coinjection nozzle having at least two melt channels ending at the same gate, said injection molding shooting pot apparatus comprising:
   a check valve moving element;
   a shooting pot piston having a proximal end and a distal end; and
   a shooting pot piston extension disposed at the distal end of the shooting pot piston and configured to dislodge said check valve moving element during a discharge cycle of said shooting pot piston.

2. An injection molding shooting pot apparatus according to claim 1, wherein said shooting pot piston extension is integrally formed with said shooting pot piston.

3. An injection molding shooting pot apparatus according to claim 1, wherein said shooting pot piston extension has (i) a length less than that of said shooting pot piston, and (ii) an outside diameter less than that of said shooting pot piston.

4. An injection molding shooting pot apparatus according to claim 1, wherein said shooting pot piston extension has at least one longitudinally-extending slot formed in an outer surface thereof configured to cause melt to move therethrough during a melt inflow cycle.

5. An injection molding shooting pot apparatus according to claim 1, wherein the injection molding shooting pot piston is configured to be disposed in a plastic resin coinjection hot runner.

6. An injection molding hot runner assembly configured to be coupled to a coinjection nozzle having at least two melt channels ending at the same gate, the hot runner assembly comprising:
   an inlet melt channel;
   an outlet melt channel;
   a shooting pot assembly disposed between said inlet melt channel and said outlet melt channel, said shooting pot assembly comprising a shooting pot cylinder and a shooting pot piston;
   a check valve disposed within said shooting pot cylinder, said check valve including a movable occlusion; and
   an extension disposed on a distal end of said shooting pot piston and configured to contact and move said check valve occlusion during an injection operation of said shooting pot piston.

7. An injection molding hot runner assembly according to claim 6, wherein said extension has (i) a length less than that of said shooting pot piston, and (ii) an outside diameter less than that of said shooting pot piston.

8. An injection molding hot runner assembly according to claim 6, wherein said check valve occlusion comprises a ball.

9. An injection molding hot runner assembly according to claim 6, wherein said check valve occlusion comprises a cylinder having (i) a conical end disposed to face said inlet melt channel, and (ii) at least one slot longitudinally disposed on an outer surface thereof.

10. An injection molding hot runner assembly according to claim 9, wherein the at least one check valve cylinder slot is configured to (i) cause incoming melt to pass through the slot, and (ii) prevent melt backflow during the injection operation of said shooting pot piston.

11. An injection molding hot runner assembly according to claim 6, wherein said extension has an outside diameter less than that of the check valve occlusion.

12. An injection molding hot runner assembly according to claim 6, wherein said extension has at least one longitudinally-extending slot formed in an outer surface thereof configured to cause melt to move therethrough during a melt inflow cycle.

13. An injection molding hot runner assembly according to claim 6, further comprising:
   a second inlet melt channel;
   a second outlet melt channel;
   a second shooting pot assembly disposed between said second inlet melt channel and said second outlet melt channel, said second shooting pot assembly comprising a second shooting pot cylinder and a second shooting pot piston;
   a second check valve disposed within said second shooting pot cylinder, said second check valve including a second movable occlusion; and
   a second extension disposed on a distal end of said second shooting pot piston and configured to contact and move said second check valve occlusion during an injection operation of said second shooting pot piston.

14. An injection mold, comprising:
   a mold cavity;
   a coinjection nozzle configured to inject a melt into said mold cavity, said coinjection nozzle having at least two melt channels ending at the same gate;
   an outlet melt channel configured to carry melt to said nozzle;
   a shooting pot piston;
   a shooting pot cylinder configured to discharge melt to said outlet melt channel upon activation of said shooting pot piston;
   an inlet melt channel configured to carry melt to said shooting pot cylinder;
   a check valve disposed between said inlet melt channel and said outlet melt channel, said check valve including a check valve occlusion; and
   an extension disposed on a distal end of said shooting pot piston and configured to contact and move said check valve occlusion during an injection operation of said shooting pot piston.

15. An injection mold according to claim 14, wherein said extension is integrally formed with said shooting pot piston.

16. An injection mold according to claim 14, wherein said extension has (i) a length less than that of said shooting pot piston, and (ii) an outside diameter less than that of said shooting pot piston.

17. An injection mold according to claim 14, wherein said extension has at least one longitudinally-extending slot formed in an outer surface thereof configured to cause melt to move therethrough during a melt inflow cycle.

18. An injection molding shooting pot assembly configured to be installed in a coinjection hot runner with a coinjection nozzle, the coinjection nozzle having at least two melt channels ending at the same gate, said assembly comprising:
   a shooting pot cylinder configured to be disposed at least partially within the coinjection hot runner;
   a shooting pot piston disposed within said shooting pot cylinder;
   a check valve chamber in fluid communication with said shooting pot cylinder;
   a check valve occlusion disposed within said check valve chamber; and
   dislodging structure disposed on a distal end of said shooting pot piston so as to contact and move said check valve occlusion during an injection operation of said shooting pot piston.

19. An injection molding shooting pot assembly configured to be installed in a coinjection hot runner with a coinjection nozzle, the coinjection nozzle having at least two melt channels ending at the same gate, said assembly comprising:

a shooting pot cylinder;

a check valve occlusion configured to move within a check valve chamber that is disposed integral with the shooting pot cylinder;

a shooting pot piston disposed within the shooting pot cylinder and configured to discharge a melt from the shooting pot cylinder through a melt outlet channel, and through the coinjection nozzle into a mold cavity; and an extension disposed on the distal end of the shooting pot piston to contact and move said check valve occlusion during the melt-discharging.

* * * * *